US012603403B2

(12) United States Patent
Kim et al.

(10) Patent No.: US 12,603,403 B2
(45) Date of Patent: Apr. 14, 2026

(54) ELECTRODE STRUCTURE AND ALL-SOLID SECONDARY BATTERY INCLUDING THE SAME

(71) Applicant: Samsung SDI Co., Ltd., Yongin-si (KR)

(72) Inventors: Hongjeong Kim, Yongin-si (KR); Younggyoon Ryu, Yongin-si (KR); Jaegu Yoon, Yongin-si (KR); Minsuk Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 770 days.

(21) Appl. No.: 17/661,198

(22) Filed: Apr. 28, 2022

(65) Prior Publication Data

US 2022/0359960 A1      Nov. 10, 2022

(30) Foreign Application Priority Data

May 6, 2021    (KR) ........................ 10-2021-0058767

(51) Int. Cl.
*H01M 50/572* (2021.01)
*H01M 10/0562* (2010.01)
(Continued)

(52) U.S. Cl.
CPC ..... *H01M 50/572* (2021.01); *H01M 10/0562* (2013.01); *H01M 50/474* (2021.01);
(Continued)

(58) Field of Classification Search
CPC ........................ H01M 10/0562; H01M 50/477
See application file for complete search history.

(56) References Cited

U.S. PATENT DOCUMENTS

| 7,054,129 B2 | 5/2006 | Aida et al. |
| 8,530,053 B2 | 9/2013 | Nishida et al. |
| (Continued) | | |

FOREIGN PATENT DOCUMENTS

| JP | 2000-106154 A | 4/2000 |
| JP | 2003-162989 A | 6/2003 |
| (Continued) | | |

OTHER PUBLICATIONS

Malmonge, L. F., Langiano, S. do C., Cordeiro, J. M. M., Mattoso, L. H. C., & Malmonge, J. A. (2010). Thermal and mechanical properties of PVDF/PANI blends. Materials Research (São Carlos, São Paulo, Brazil), 13(4), 465-470. https://doi.org/10.1590/S1516-14392010000400007. (Year: 2010).*

(Continued)

*Primary Examiner* — Allison Bourke
*Assistant Examiner* — Travis L. Martin
(74) *Attorney, Agent, or Firm* — Womble Bond Dickinson (US) LLP

(57) ABSTRACT

Provided are an electrode structure and an all-solid secondary battery including the electrode structure, the electrode structure including a cathode layer, an anode layer, and a solid electrolyte layer between the cathode layer and the anode layer, the cathode layer including a cathode current collector and a cathode active material layer on at least one surface of the cathode current collector, the anode layer including an anode current collector and an anode active material layer on at least one surface of the anode current collector, and the solid electrolyte having a margin of about 2% or less of a width of the solid electrolyte layer, at two ends in a width direction, and an insulating layer having a storage elastic modulus (E') of greater than about 4.0 GPa being at two sides integrally surrounding the cathode layer, the anode layer, and the solid electrolyte layer.

17 Claims, 3 Drawing Sheets

(51) Int. Cl.
H01M 50/474 (2021.01)
H01M 50/483 (2021.01)
H01M 50/486 (2021.01)
H01M 50/489 (2021.01)

(52) U.S. Cl.
CPC ....... H01M 50/483 (2021.01); H01M 50/486 (2021.01); H01M 50/489 (2021.01)

(56) References Cited

U.S. PATENT DOCUMENTS

| | | | |
|---|---|---|---|
| 10,886,515 B2 | 1/2021 | Fujiki et al. | |
| 11,217,819 B2 | 1/2022 | Waseda | |
| 11,557,803 B2 | 1/2023 | Yang | |
| 2003/0054239 A1 | 3/2003 | Watanabe et al. | |
| 2014/0356692 A1 | 12/2014 | Park et al. | |
| 2017/0179520 A1* | 6/2017 | Seo .................. | H01M 10/0525 |
| 2017/0373300 A1 | 12/2017 | Maeda et al. | |
| 2018/0159173 A1* | 6/2018 | Chika ................... | H01G 11/64 |
| 2018/0342710 A1 | 11/2018 | Yoon et al. | |
| 2019/0363317 A1 | 11/2019 | Honda et al. | |
| 2019/0372157 A1* | 12/2019 | Oura ................ | H01M 10/0525 |
| 2020/0212491 A1* | 7/2020 | Collins ................... | H01M 4/70 |
| 2020/0313229 A1 | 10/2020 | Haga et al. | |
| 2021/0066757 A1* | 3/2021 | Yamauchi ......... | H01M 10/0562 |
| 2022/0328870 A1 | 10/2022 | Kang et al. | |
| 2023/0369688 A1* | 11/2023 | Mitani ............. | H01M 10/0585 |
| 2023/0402709 A1* | 12/2023 | Mun ................... | H01M 50/446 |

FOREIGN PATENT DOCUMENTS

| | | |
|---|---|---|
| JP | 2005-123150 A | 5/2005 |
| JP | 5494089 B2 | 5/2014 |
| JP | 2018-206469 A | 12/2018 |
| JP | 2019-139892 A | 8/2019 |
| JP | 2019-153535 A | 9/2019 |
| JP | 2019-207873 A | 12/2019 |
| JP | 2020-24922 A | 2/2020 |
| JP | 2020-027742 A | 2/2020 |
| KR | 10-2014-0074176 A | 6/2014 |
| KR | 10-2014-0082585 A | 7/2014 |
| KR | 10-2018-0128573 A | 12/2018 |
| KR | 10-2020-0069215 A | 6/2020 |

| | | |
|---|---|---|
| WO | 2006/046534 A1 | 5/2006 |
| WO | 2016/152565 A1 | 9/2016 |
| WO | 2019/103008 A1 | 5/2019 |

OTHER PUBLICATIONS

Gomez, C., Mira, J., Carrion-Vilches, F. J., & Cavas, F. (2021). Dynamic Moduli of Polybutylene Terephthalate Glass Fiber Reinforced in High-Temperature Environments. Materials, 14(3), 483. https://doi.org/10.3390/ma14030483. (Year: 2021).*

Brandrup, J. Immergut, Edmund H. Grulke, Eric A. Abe, Akihiro Bloch, Daniel R.. (1999; 2005). Polymer Handbook (4th Edition)—E. Physical Constants of Poly(vinylidene Fluoride). John Wiley & Sons. pp. V/49. (Year: 1999; 2005) (Year: 1999).*

Thomason, J.L., Hartman, D.R. (1999). Properties of glass fibers for polypropylene reinforcement. In: Karger-Kocsis, J. (eds) Polypropylene. Polymer Science and Technology Series, vol. 2. Springer, Dordrecht. pp. 678-685. https://doi.org/10.1007/978-94-011-4421-6_92 (Year: 1999).*

Chen, H. M., Maohua, C., & Adams, S. (2015). Stability and ionic mobility in argyrodite-related lithium-ion solid electrolytes. Physical Chemistry Chemical Physics, 17(25), 16494-16506. https://doi.org/10.1039/c5cp01841b (Year: 2015).*

Lu, S., Kosaka, F., Shiotani, S., Tsukasaki, H., Mori, S., & Otomo, J. (2021). Optimization of lithium ion conductivity of $Li_2S$—$P_2S_5$ glass ceramics by microstructural control of crystallization kinetics. Solid State Ionics, 362, 115583. https://doi.org/10.1016/j.ssi.2021.115583 (Year: 2021).*

Office action issued Apr. 24, 2023, in corresponding JP Patent Application No. 2022-076171, 7pp.

European Search Report for corresponding European Application No. 22 17 0613, dated Oct. 7, 2022, 6pp.

Dynamic Mechanical Analysis (DMA). A Beginner's Guide. PerkinElmer, Inc., 2008-2013, 23pp., www.perkinelmer.com.

Lee, Yong-Gun et al.; "High-energy long-cycling all-solid-state lithium metal batteries enabled by silver-carbon composite anodes"; Nature Energy; vol. 5, Apr. 2020; pp. 299-308.

Office action issued in JP Patent Application No. 2022-076171, dated Oct. 30, 2023, 8pp.

Korean Office Action for KR Application No. 10-2021-0058767, dated May 29, 2025, 6 pages.

* cited by examiner

30

30

28        28

24 } 27
25 }

23

22 } 26
21
22' } 26'

23'

25' } 27'
24' }

28'        28'

ELECTRODE STRUCTURE AND ALL-SOLID SECONDARY BATTERY INCLUDING THE SAME

CROSS-REFERENCE TO RELATED APPLICATION

This application claims priority to and the benefit of Korean Patent Application No. 10-2021-0058767, filed on May 6, 2021, in the Korean Intellectual Property Office, the entire content of which is hereby incorporated by reference.

BACKGROUND

1. Field

One or more embodiments of the present disclosure relate to an electrode structure and an all-solid secondary battery including the electrode structure.

2. Description of the Related Art

In recent years, batteries having improved energy density and safety have been actively developed in accordance with industrial demand. For example, lithium-ion batteries have been put to practical use in the automotive industry as well as in information-related equipment and communication equipment. In the automotive industry, safety is particularly important to protect life.

Lithium-ion batteries which are currently commercialized use an electrolytic solution including a flammable organic solvent, and thus there is a possibility of overheating and fire when a short-circuit occurs. As a result, an all-solid secondary battery using a solid electrolyte instead of an electrolytic solution has been proposed.

Because an all-solid secondary battery does not use a flammable organic solvent, the possibility of fire or an explosion may be greatly reduced even when a short-circuit occurs. Therefore, such an all-solid secondary battery may greatly enhance safety as compared with a lithium-ion battery using an electrolytic solution.

SUMMARY

One or more embodiments of the present disclosure include an electrode structure having a novel structure.

One or more embodiments include an all-solid secondary battery including the electrode structure.

Additional aspects of embodiments will be set forth in part in the description which follows and, in part, will be apparent from the description, or may be learned by practice of the presented embodiments of the disclosure.

According to one or more embodiments, an electrode structure includes a cathode layer, an anode layer, and a solid electrolyte layer between the cathode layer and the anode layer, the cathode layer including a cathode current collector and a cathode active material layer on at least one surface of the cathode current collector, the anode layer including an anode current collector and an anode active material layer on at least one surface of the anode current collector, and the solid electrolyte layer having a margin that is about 2% or less of a width of the solid electrolyte layer at two ends in a width direction, an insulating layer having a storage elastic modulus (E') of greater than about 4.0 GPa being at two sides integrally surrounding the cathode layer, the anode layer, and the solid electrolyte layer.

The insulating layer may have a loss tangent (tan$\delta$) of less than about 0.5.

The insulating layer may have a resistivity of about $1\times10^6$ ohm/cm or greater.

The insulating layer may be at least one layer.

The insulating layer may include a polymer or a composite of a polymer and an inorganic material.

The polymer may include a fluorine-based polymer, a cellulose-based polymer, an epoxy-based resin, or a combination thereof.

A volume ratio of the polymer in the composite of the polymer and the inorganic material may be about 50 vol % or greater based on 100 vol % of a total composition forming the composite.

The inorganic material may include a metal oxide, a metal hydroxide, or a combination thereof.

A mixture density of the cathode active material layer may be about 3.0 g/cc or greater.

The cathode active material layer may include a sulfide-based solid electrolyte.

The anode active material layer may include at least one selected from a carbonaceous anode active material and a metal or metalloid anode active material.

The carbonaceous anode active material may include at least one selected from amorphous carbon and crystalline carbon.

The metal or metalloid anode active material may include at least one selected from gold (Au), platinum (Pt), palladium (Pd), silicon (Si), silver (Ag), aluminum (Al), bismuth (Bi), tin (Sn), and zinc (Zn).

The solid electrolyte layer may include a sulfide-based solid electrolyte represented by Formula 1:

$$Li^+_{12-n-x}A^{n+}X^{2-}_{6-x}Y^-_x \qquad \text{Formula 1}$$

In Formula 1, A may be P, As, Ge, Ga, Sb, Si, Sn, Al, In, Ti, V, Nb, or Ta,

X is S, Se, or Te, Y is Cl, Br, I, F, CN, OCN, SCN, or N$_3$, $1<x<5$, and $0<n<2$.

A peel strength of the solid electrolyte layer to the cathode layer or the anode layer may be about 0.2 gf/mm or greater.

The electrode structure may have a jelly-roll form or a stack form.

Cracks may not occur in the electrode structure when the electrode structure is compressed in a thickness direction to a thickness of about 20% to about 30% of a thickness of the electrode structure.

According to one or more embodiments, an all-solid secondary battery includes the electrode structure.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
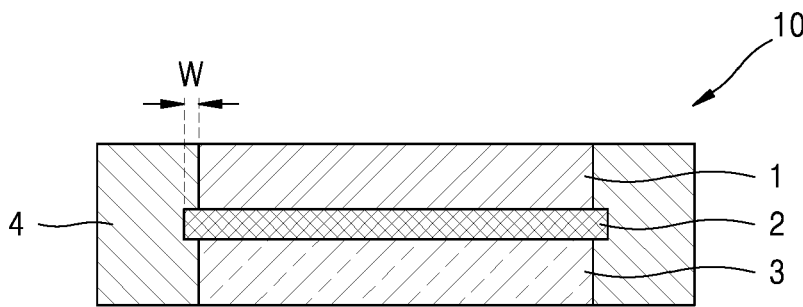
FIG. 1 is a schematic cross-sectional view of an electrode structure according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an electrode structure according to an embodiment and an all-solid secondary battery including the electrode structure will be described in more detail with reference to the accompanying drawings. These embodiments are provided for illustrative purposes only and are not intended to limit the scope of the present disclosure, and the present disclosure should be defined by the spirit and scope of the appended claims, and equivalents thereof.

Expressions such as "at least one of," when preceding a list of elements, modify the entire list of elements and do not modify the individual elements of the list. Unless otherwise stated herein, the term "combinations" is inclusive of mixtures, alloys, and reaction products.

It will be understood that unless otherwise stated herein, the terms "comprises" and/or "comprising," or "includes" and/or "including" do not preclude other elements, but further include other elements.

The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise.

Reference throughout the specification to "some embodiments," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

All-solid secondary batteries in the art have good stability but have a solid electrolyte, which reduces flexibility and processability of all-solid secondary batteries as compared to those of lithium-ion batteries. In this regard, an electrode structure including a cathode plate, an anode plate, and an electrolyte layer may not secure suitable or sufficient margins of width between the electrode plates and the electrolyte layer. Also, burrs or cracks may occur at the edges of the outermost parts of the electrode plates and the electrolyte layer. In this case, a short-circuit may occur in the all-solid secondary battery, which may degrade capacity and lifespan characteristics of the all-solid secondary battery. The present inventors have reduced degradation of capacity and lifespan characteristics of embodiments of an all-solid secondary battery by providing a-layer at sides of an electrode structure.

Hereinafter, an electrode structure and an all-solid secondary battery according to one or more embodiments will be described in more detail.

Electrode Structure

An electrode structure according to an embodiment may include a cathode layer, an anode layer, and a solid electrolyte layer-between the cathode layer and the anode layer. The cathode layer may include a cathode current collector and a cathode active material layer on at least one surface of the cathode current collector, the anode layer may include an anode current collector and an anode active material layer on at least one surface of the anode current collector, and the solid electrolyte layer may have no margin or a margin of about 2% or less of a width of the solid electrolyte layer at two ends (e.g., two opposite ends or both ends) in a width direction. An insulating layer having a storage elastic modulus (E') of greater than about 4.0 GPa may be at two sides (e.g., to opposite sides or both sides) integrally surrounding the cathode layer, the anode layer, and the solid electrolyte layer. In some embodiments, the insulating layer surrounds four sides of the electrode structure. For example, the insulating layer may be a monolithic insulating layer (e.g., an insulating layer that is a sole, contiguous piece) that surrounds four sides of the electrode structure.

The electrode structure may include the insulating layer at two sides (e.g., two opposite sides or both sides) integrally surrounding the cathode layer, the anode layer, and the solid electrolyte layer. The insulating layer has a storage elastic modulus (E') of greater than about 4.0 GPa. In general, a storage elastic modulus (E') of an insulating layer is high when a storage modulus (E') of a solid electrolyte layer is in a range of about 1.3 to about 4.0. Therefore, the electrode structure is not deformed by pressing during preparation of a battery, and thus, a short-circuit is prevented (or a likelihood or degree of such short-circuit is reduced) as a result. This may prevent a short-circuit (or reduce a likelihood or degree of such a short-circuit) even when the solid electrolyte layer has no margin or a very small margin as small as about 2% or less of a width of the solid electrolyte layer at two ends (e.g., two opposite ends or both ends) in a width direction.

Figure 2A:
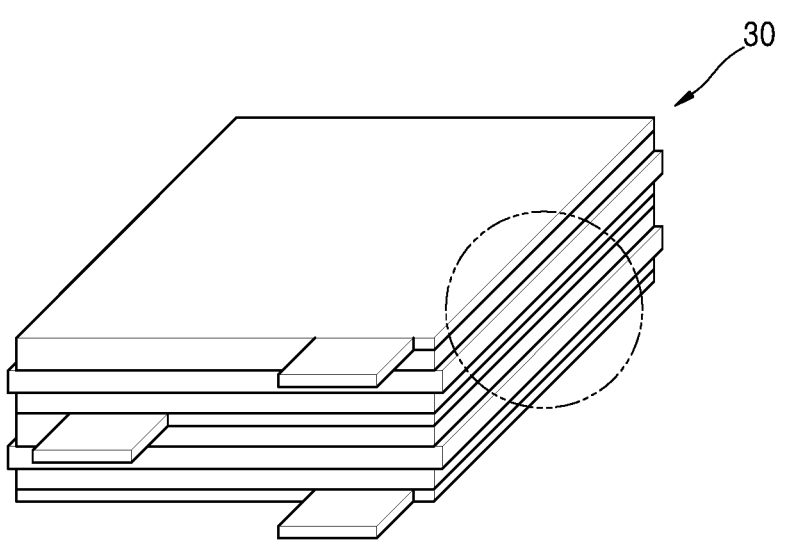
FIG. 2A is a schematic perspective view that shows an electrode structure in a stack form, according to an embodiment.
Figure 2B:
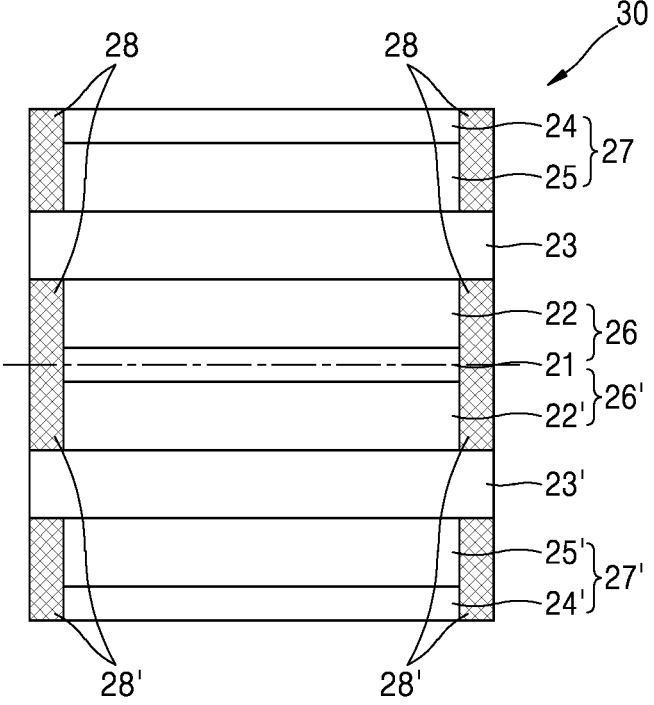
FIG. 2B is a schematic cross-sectional view that shows an inside of the electrode structure of FIG. 2A (a dotted circle).

FIG. 1 is a schematic cross-sectional view of an electrode structure 10 according to an embodiment. FIG. 2A is a schematic perspective view that shows an electrode structure 30 in a stack form, according to an embodiment. FIG. 2B is a schematic cross-sectional view that shows an inside of the electrode structure of FIG. 2A (a dotted circle).

Referring to FIG. 1, the electrode structure 10 includes a cathode layer 1, a solid electrolyte layer 2, and an anode layer 3 that are sequentially stacked, and an insulating layer 4 is located at two sides (e.g., two opposite sides or both sides) integrally surrounding the cathode layer 1, the solid electrolyte layer 2, and the anode layer 3. The solid electrolyte layer 2 has a margin w at two ends (e.g., two opposite sides or both ends) in a width direction. For example, a width of the margin w may be about 0.5 mm or less. The margin w may be a distance that the solid electrolyte layer 2 extends past the cathode layer 1 and/or the anode layer 2 in the width direction, and the respective widths of the margin w at the two opposite sides may be the same or substantially the same as each other.

Referring to FIGS. 2A and 2B, the electrode structure 30 has a bi-cell structure in a stack form. The electrode structure 30 has cathode layers 26 and 26' including cathode active material layers 22 and 22' on upper and lower surfaces of a cathode current collector 21, respectively; solid electrolyte layers 23 and 23' on one surface of the cathode layers 26 and 26', respectively; anode active material layers 25 and 25' on one surface of the solid electrolyte layers 23 and 23', respectively; and anode layers 27 and 27' including anode active material layers 25 and 25' and anode current collectors 24 and 24', respectively. Insulating layers 28 and 28' are on each of two sides (e.g., two opposite sides or both sides) of the cathode layers 26 and 26', the solid electrolyte layers 23 and 23', and the anode layers 27 and 27', respectively.

Although the electrode structure 30 is illustrated in a stack form in the drawing, the electrode structure 30 may have a jelly-roll form or a stack form.

Cracks may not occur in the electrode structure 30 when the electrode structure 30 is compressed in a thickness direction to about 20% to about 30% of a thickness of the electrode structure 30 (e.g., about 20% to about 30% of an initial thickness of the electrode structure 30).

Insulating Layer

The insulating layer 28 or 28' may have a storage modulus (E') of greater than about 4.0 GPa. The electrode structure 10 or 30 including the insulating layers 28 and 28' having the storage modulus (E') is not deformed by pressing during preparation of a battery in a jelly-roll form or a stack form, and a short-circuit in the battery may be prevented (or a likelihood or degree of such a short-circuit may be reduced).

The insulating layer 28 or 28' may have a loss tangent (tan δ) of less than about 0.5. A loss tangent (tan δ) is a ratio of a storage non-elastic modulus (E") to a storage elastic modulus (E'), which is E"/E'. A loss tangent (tan δ) is related to restoring force. Restoring force is a force that restores an electrode structure after being compressed by pressing during preparation of a battery, which reduces a possibility of short-circuit occurrence during charging and discharging of the battery. Generally, a loss tangent (tan δ) of the insulating layer 28 or 28' is low when the loss tangent (tan δ) of a solid electrolyte layer is in a range of about 0.05 to about 0.15. Therefore, the restoring force of the electrode structure 10 or 30 is exercised or relied upon during preparation of a battery, and thus, deformation by pressing does not occur, which results in prevention of a short-circuit (or a reduction in a likelihood or degree of such a short-circuit).

A storage elastic modulus (E') and a storage non-elastic modulus (E") of the insulating layer 28 or 28' may be obtained by dynamic mechanical analysis (DMA). For example, a storage elastic modulus (E') and a storage non-elastic modulus (E") may be derived by applying an external force in the form of a sine wave having a frequency of 1 Hz to a sample having a size of 10 m×5 mm and measuring the displacement and phase of the sample deformed according to the force.

The insulating layer 28 or 28' may have a resistivity of about $1 \times 10^6$ ohm/cm or greater. The insulating layer 28 or 28' may be electrically insulated to suppress a short-circuit in the electrode structure 10 or 30 (or to reduce a likelihood or degree of such a short circuit).

The insulating layer 28 or 28' may be at least one layer. For example, the insulating layer 28 or 28' may be a multilayer including two layers or three layers. The number of layers of the insulating layer 28 or 28' may be controlled or set to be within a range that satisfies the storage elastic modulus (E'), the storage non-elastic modulus (E"), and the loss tangent (tan δ).

The insulating layer 28 or 28' may include a polymer or a composite of a polymer and an inorganic material. Examples of the polymer may include a fluorine-based polymer, a cellulose-based polymer, an epoxy-based resin, or a combination thereof.

Examples of the fluorine-based polymer may include a homopolymer of vinylidene fluoride monomers or a copolymer of a fluorine-containing monomer of a vinylidene fluoride monomer and at least one selected from tetrafluoroethylene, hexafluoropropylene, chlorotrifluoroethylene, fluorovinyl, and perfluoroalkyl vinyl ether. In some embodiments, the vinylidene monomer may include, for example, a vinylidene fluoride homopolymer, a vinylidene fluoride-hexafluoropropylene copolymer, or a vinylidene fluoride-chlorotrifluoroethylene copolymer.

Optionally, the fluorine-based polymer may be a copolymer of a monomer containing a polar functional group and a vinylidene fluoride monomer, or may further include a copolymer of a monomer containing a polar functional group, a vinylidene fluoride monomer, and any other fluorine-based monomer described above. For example, the vinylidene fluoride polymer containing a polar functional group may include a polar functional group-containing monomer-vinylidene fluoride copolymer, a polar functional group-containing monomer-vinylidene fluoride-hexafluoropropylene copolymer, or a polar functional group-containing monomer-vinylidene fluoride-chlorotrifluoroethylene copolymer. The polar functional group may be at least one selected from a carboxylic acid group, a sulfonic acid group, a phosphoric acid group, a hydroxyl group, and salts thereof, but embodiments are not limited thereto, and any suitable polar functional group available in the art may be used. Introduction of the polar functional group into the fluorine-based polymer may be performed by polymerizing monomers including at least one selected from a carboxylic acid group, a sulfonic acid group, a phosphoric acid group, a hydroxyl group, and a salt thereof. Examples of the monomer having a carboxylic acid group may include monocarboxylic acid and a derivative thereof, and dicarboxylic acid and a derivative thereof. Examples of the monocarboxylic acid may include acrylic acid, methacrylic acid, and crotonic acid. Examples of the derivative of monocarboxylic acid may include 2-ethylacrylic acid, isocrotonic acid, α-acetoxyacrylic acid, β-trans-aryloxyacrylic acid, α-chloro-β-E-methoxy acrylic acid, and β-diaminoacrylic acid. Examples of the dicarboxylic acid may include maleic acid, fumaric acid, and itaconic acid. Examples of the derivative of dicarboxylic acid may include maleic acid, such as methyl maleic acid, dimethyl maleic acid, phenyl maleic acid, chloro maleic acid, dichloro maleic acid, and fluoromaleic acid; and maleic acid salt, such as methylallyl maleate, diphenyl maleate, nonyl hydrogen maleate, decyl hydrogen maleate, dodecyl hydrogen maleate, octadecyl hydrogen maleate, and fluoroalkyl maleate. Also, an acid anhydride that produces a carboxylic acid by hydrolysis may be used. Examples of an acid anhydride of the dicarboxylic acid are an maleic anhydride, an acrylic anhydride, a methyl maleic anhydride, and a dimethyl maleic anhydride. Also, a monoester and a diester of $\alpha,\beta$-ethylenically unsaturated polyvalent carboxylic acid, such as monoethyl maleate, diethyl maleate, monobutyl maleate, dibutyl maleate, monoethyl fumareate, diethyl fumareate, monobutyl fumareate, dibutyl fumareate, monocyclohexyl fumareate, dicyclohexyl fumareate, monoethyl itaconate, diethyl itaconate, monobutyl itaconate, and/or dibutyl itaconate, may be further used. Examples of a monomer having a sulfonic acid group may include vinylsulfonic acid, methyl vinylsulfonic acid, (meth)allylsulfonic acid, styrenesulfonic acid, (meth) acrylic acid-2-ethyl sulfonic acid, 2-acrylamid-2-methylpropanesulfonic acid, and 3-allyloxy-2-hydroxypropanesulfonic acid. Examples of a monomer having a phosphoric acid group may include phosphate 2-(meth)acryloyloxyethyl, phosphoric acid methyl-2-(meth)acryloyloxyethyl, and phosphoric acid ethyl-(meth)acryloyloxyethyl. Examples of a monomer having a hydroxyl group may include an ethylenically unsaturated alcohol, such as (meth)allylalcohol, 3-butene-1-ol, and 5-hexene-1-ol; alkanolesters of an ethylenically unsaturated carboxylic acid, such as acrylic acid-2-hydroxyethyl, acrylic acid-2-hydroxypropyl, methacrylic acid-2-hydroxyethyl, methacrylic acid-2-hydroxypropyl, maleic acid di2-hydroxyethyl, maleic acid di4-hydroxybutyl, and itaconic acid di2-hydroxypropyl; an ester of polyalkyleneglycol and (meth)acrylic acid represented by $CH_2=CR_1-COO-(C_nH_{2n}O)_m-H$ (where m is an integer of 2 to 9, n is an integer of 2 to 4, and $R_1$ is a hydrogen or a methyl group); a mono(meth)ester acrylic acid of a dihydroxyester of a dicarboxylic acid, such as 2-hydroxyethyl-2'-(meth)acryloyloxyphthalate, and 2-hydroxyethyl-2'-(meth)acryloyloxysuccinate; vinylether, such as 2-hydroxyethylvinylether and 2-hydroxypropylvinylether; a mono(meth)allyl ether of alkyleneglycol, such as (meth) allyl-2-hydroxyethylether, (meth)allyl-2-hydroxypropylether, (meth)allyl-3-hydroxypropylether, (meth)allyl-2-hydroxy butylether, (meth)allyl-3-hydroxybutylether, (meth) allyl-4-hydroxybutylether, and (meth)allyl-6-hydroxyhexylether; polyoxyalkyleneglycol(meth) monoallylether, such as diethyleneglycol mono(meth) allylether and dipropyleneglycolmono(meth)allylether; mono(meth)allylether of a halogen and hydroxy substituent of (poly)alkyleneglycol, such as glycerin mono(meth)allylether, (meth)allyl-2-chloro-3-hydroxypropylether, and (meth)allyl-2-hydroxy-3-chloropropylether; a mono(meth) allylether of polyphenol, such as eugenol and isoeugenol, and a halogen substituent thereof; and (meth)allylthioethers of alkyleneglycol, such as (meth)allyl-2-hydroxyethylthioether and (meth)allyl-2-hydroxypropylthioether. The fluorine-based polymer improves adhesive strength to an electrode and flexibility, and thus, may provide a battery having improved energy density and lifespan characteristics.

Examples of the cellulose-based polymer may include at least one selected from cellulose, methyl cellulose, ethyl cellulose, butyl cellulose, hydroxypropyl cellulose, cellulose acetate, cellulose acetate propionate, and cellulose acetate butyrate. A type or kind of the cellulose-based polymer is not limited, but an example of the cellulose-based polymer may include a nanofiber type or kind. The cellulose-based polymer has excellent mechanical strength and optical transparency. Thus, a battery including the cellulose-based polymer as the insulating layer 28 or 28' may have excellent lifespan characteristics and stability.

The epoxy-based resin may be at least one selected from a cresol novolac epoxy resin, a bisphenol A-type epoxy resin, a bisphenol A-type novolac epoxy resin, a phenol novolac epoxy resin, a tetrafunctional epoxy resin, a biphenyl-type epoxy resin, a triphenolmethane-type epoxy resin, an alkyl-modified triphenol methane epoxy resin, a naphthalene-type epoxy resin, a dicyclopentadiene-type epoxy resin, a dicyclopentadiene-modified phenol-type epoxy resin, a urethane-modified epoxy resin, and a combination thereof, but embodiments are not limited thereto. The epoxy-based resin has excellent mechanical properties and electric insulating properties.

A volume ratio of the polymer in the composite of the polymer and the inorganic material may be about 50 vol % or greater based on 100 vol % of a total composition forming the composite. Physical properties such as a storage elastic modulus (E') and a storage non-elastic modulus (E") of the insulating layer 28 or 28' may be enhanced when a volume ratio of the polymer is within this range. Also, as a weight ratio of the inorganic material in the composite of the polymer and the inorganic material increases, strength and a storage elastic modulus (E') of the composite of the polymer and the inorganic material may increase but a storage non-elastic modulus (E") may also increase. Thus, a weight ratio of the polymer to the inorganic material in the composite of the polymer and the inorganic material may be in a range of about 1:1 to about 1:5. When a weight ratio of the polymer and the inorganic material is within this range, physical properties such as a storage elastic modulus (E') and a storage non-elastic modulus (E") of the insulating layer 28 or 28' may be enhanced.

The inorganic material may include a metal oxide, a metal hydroxide, or a combination thereof. Examples of the inorganic material may include $Al_2O_3$ and $Al(OH)_3$, but embodiments are not limited thereto, and any suitable inorganic material that may be used in an all-solid secondary battery in the art may be used.

Cathode Layer

The cathode layer 26 or 26' includes a cathode current collector 21 and a cathode active material layer 22 or 22' on at least one surface of the cathode current collector 21.

The cathode active material layer 22 or 22' may include, for example, a cathode active material and a solid electrolyte. The solid electrolyte in the cathode layer 26 or 26' may be similar to or different from a solid electrolyte in the solid electrolyte layer 23 or 23'. For example, the solid electrolyte may include a sulfide-based solid electrolyte. Additional details about the solid electrolyte may be the same as described in relation to the solid electrolyte layer 23 or 23'.

The cathode active material may be a cathode active material capable of reversibly absorbing and desorbing lithium ions (e.g., capable of reversibly intercalating and deintercalating lithium ions). Examples of the cathode active material include, for example, a lithium transition metal oxide such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, and lithium iron phosphate; nickel sulfide, copper sulfide, lithium sulfide; iron oxide, and vanadium oxide, but embodiments are not limited thereto, and any suitable cathode active material may be used. The cathode active material may be used alone or in a mixture of at least two selected from these examples.

The lithium transition metal oxide may be, for example, a compound represented by one of the following formulae: $Li_aA_{1-b}B'_bD'_2$(where $0.90 \leq a \leq 1$, and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0\alpha2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90$ a 1, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, 0 $d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where $0.90 \leq a \leq 1$, and $0.001 \leq b \leq 0.1$); $Li_aMnG_bO_2$ (where $0.90 \leq a \leq 1$, and $0.001 \leq b \leq 0.1$); $Li_aMn2GbO4$ (where $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D' may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. The compounds may have a surface coating layer (hereinafter, also referred to as "coating layer"). In some embodiments, a mixture of a compound without a coating layer and a compound having a coating layer, the compounds being selected from the compounds listed above, may be used. In some embodiments, the coating layer may include at least one compound of a coating element selected from oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any suitable method that does not adversely affect the physical properties of the cathode active material when a compound of the coating element is used. For example, the coating layer may be formed using a spray coating method and/or a dipping method. The coating methods may be well understood by one of ordinary skill in the art, and thus, a detailed description thereof will not be provided here.

The cathode active material may include, for example, a lithium salt of a transition metal oxide that has a layered rock-salt type structure among the examples of the lithium transition metal oxide. For example, as used herein, the term "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. As used herein, the term "cubic rock-salt type structure" refers to a sodium chloride (NaCl) type structure, which is one of the crystalline structures, for example, to a structure in which face-centered cubic (fcc) lattices respectively formed of anions and cations are shifted by only a half of the ridge of each unit lattice. Examples of the lithium transition metal oxide having the layered rock-salt type structure may include a ternary lithium transition metal oxide expressed as $LiNi_xCo_yAl_zO_2$ (NCA) or $LiNi_xCo_yMn_zO_2$(NCM) (where $0 < x < 1$, $0 < y < 1$, $0 < z < 1$, and $x + y + z = 1$). When the cathode active material includes a ternary transition metal oxide having the layered rock-salt type structure, an energy density and thermal stability of the all-solid secondary battery may be improved.

The cathode active material may be covered by a coating layer as described above. The coating layer is any suitable material that may be used as a coating layer of a cathode active material of an all-solid secondary battery in the art. The coating layer may be, for example, $Li_2O$—$ZrO_2$ (LZO).

When the cathode active material includes nickel (Ni) as a ternary lithium transition metal oxide such as NCA or NCM, a capacity density of the all-solid secondary battery increases, and thus, metal elution from the cathode active material in a charged state may be reduced. As a result, the all-solid secondary battery according to an embodiment may have improved cycle characteristics in a charged state.

A shape of the cathode active material may be, for example, particle shapes such as a true spherical shape, an elliptical shape, or a spherical shape (e.g., a generally spherical shape). A particle diameter of the cathode active material is not particularly limited but may be in any suitable range applicable to a cathode active material of an all-solid secondary battery of the related art. An amount of the cathode active material of the cathode layer 26 or 26' is not particularly limited and may be in any suitable range applicable to a cathode layer of an all-solid secondary battery of the related art.

A D50 average particle diameter of the solid electrolyte in the cathode active material layer 22 or 22' may be less than that of the solid electrolyte in the solid electrolyte layer 23 or 23'. For example, a D50 average particle diameter of the solid electrolyte in the cathode active material layer 22 or 22' may be about 90% or less, about 80% or less, about 70% or less, about 60% or less, about 50% or less, about 40% or less, about 30% or less, or about 20% or less of a D50 average particle diameter of the solid electrolyte in the solid electrolyte layer 23 or 23'.

A D50 average particle diameter may be, for example, a median particle diameter (D50). The median particle diameter (D50) may be, for example, a size of the particle corresponding to 50% of the cumulative volume calculated from the size of a particle having a small particle size in the particle size distribution, as measured by a laser diffraction method.

The cathode active material layer 22 or 22' may include a binder. Examples of the binder may include styrene butadiene rubber (SBR), polytetrafluoroethylene, polyvinylidene fluoride, and polyethylene, but embodiments are not limited thereto, and any suitable material available as a binder in the art may be used.

The cathode active material layer 22 or 22' may include a conducting agent. Examples of the conducting agent may include graphite, carbon black, acetylene black, ketjen black, carbon fiber, and metal powder, but embodiments are not limited thereto, and any suitable material available as a conducting agent in the art may be used.

The cathode active material layer 22 or 22' may further include, for example, additives such as a filler, a coating agent, a dispersant, and an ion conducting agent in addition to the cathode active material, solid electrolyte, binder, and conducting agent.

The filler, coating agent, dispersant, and ion conducting agent that may be included in the cathode active material layer 22 or 22' may be any suitable material that is generally used in an electrode of an all-solid secondary battery in the art.

A mixture density of the cathode active material layer 22 or 22' may be 3.0 g/cc or higher.

The cathode current collector 21 may be a plate or a foil formed of, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), and/or an alloy thereof. The cathode current collector 21 may be omitted. A thickness of the cathode current collector 21 may be, for example, in a range of about 1 μm to about 100 μm, about 1 μm to about 50 μm, about 5 μm to about 25 μm, or about 10 μm to about 20 μm.

Solid Electrolyte Layer

Referring to FIGS. 1 and 2, the solid electrolyte layer 2, 23, or 23' may include a solid electrolyte between the cathode layer 1, 26, or 26' and the anode layer 3, 27, or 27'.

The solid electrolyte may be, for example, a sulfide-based solid electrolyte. The sulfide-based solid electrolyte may be, for example, at least one selected from $Li_2S—P_2S_5$, $Li_2S—P_2S_5—LiX$ (where X is a halogen), $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCI$, $Li_2S—SiS_2—B_2S_3—LiI$, $Li_2S—SiS_2—P_2S_5—LiI$, $Li_2S—B_{2}S_3$, $Li_2S—P_2S_5—ZmSn$ (where m and n are each independently a positive integer, and Z is one of Ge, Zn, and/or Ga), $Li_2S—GeS_2$, $Li_2S—SiS_2—Li_3PO_4$, $Li_2S—SiS_2—Li_pMO_q$ (where p and q are each independently a positive integer, and M is one of P, Si, Ge, B, Al, Ga, and/or In), $Li_{7-x}PS_{6-x}Cl_x$ (where $0≤x≤2$), $Li_{7-x}PS_{6-x}Br_x$ (where $0≤x≤2$), and $Li_{7-x}PS_{6-x}I_x$ (where $0≤x≤2$). The sulfide-based solid electrolyte may be prepared by melting and quenching starting materials (e.g., $Li_2S$ and/or $P_2S_5$), or mechanically milling the starting materials. Subsequently, the resultant may be heat-treated. The solid electrolyte may be amorphous and/or crystalline and may be a mixed form thereof. Also, the solid electrolyte may include at least sulfur (S), phosphorus (P), and lithium (Li), as component elements among the sulfide-based solid electrolyte materials. For example, the solid electrolyte may be a material including $Li_2S—P_2S_5$. When the material including $Li_2S—P_2S_5$ is used as a sulfide-based solid electrolyte material that forms a solid electrolyte, a mixing molar ratio of $Li_2S$ and $P_2S_5$ ($Li_2S:P_2S_5$) may be, for example, selected in a range of about 50:50 to about 90:10.

The sulfide-based solid electrolyte may include, for example, an argyrodite-type solid electrolyte represented by Formula 1.

$$Li^+_{12-n-x}A^{n+}X^{2-}_{6-x}Y^-_x. \qquad \text{Formula 1}$$

In Formula 1, A is P, As, Ge, Ga, Sb, Si, Sn, Al, In, Ti, V, Nb, or Ta, X is S, Se, or Te, Y is CI, Br, I, F, CN, OCN, SCN, or $N_3$, $1<x<5$, and $0<n<2$. The sulfide-based solid electrolyte may be, for example, an argyrodite-type compound including at least one selected from $Li_{7-x}PS_{6-x}Cl_x$ (where $0≤x≤2$), $Li_{7-x}PS_{6-x}Br_x$ (where $0≤x≤2$), and $Li_{7-x}PS_{6-x}I_x$ (where $0≤x≤2$). The sulfide-based solid electrolyte may be, for example, an argyrodite-type compound including at least one selected from $Li_6PS_5Cl$, $Li_6PS_5Br$, and $Li_6PS_5I$.

A density of the argyrodite-type solid electrolyte may be in a range of about 1.5 g/cc to about 2.0 g/cc. When the argyrodite-type solid electrolyte has a density of about 1.5 g/cc or higher, internal resistance of an all-solid secondary battery may decrease, and thus penetration of the solid electrolyte layer by Li may be effectively suppressed or reduced.

The solid electrolyte layer 2, 23, or 23' may include, for example, a binder. Examples of the binder included in the solid electrolyte layer 2, 23, or 23' may include styrene butadiene rubber (SBR), polytetrafluoroethylene, polyvinylidene fluoride, and polyethylene, but embodiments are not limited thereto, and any suitable material available as a binder in the art may be used. The binder of the solid electrolyte layer 2, 23, or 23' may be the same as or different from binders of the cathode active material layer 22 or 22' and the anode active material layer 25 or 25'. The binder may be omitted.

An amount of the binder in the solid electrolyte layer 2, 23, or 23' may be in a range of about 0 wt % to about 10 wt %, about 0 wt % to about 5 wt %, about 0 wt % to about 3 wt %, about 0 wt % to about 1 wt %, about 0 wt % to about 0.5 wt %, or about 0 wt % to about 0.1 wt %, based on the total weight of the solid electrolyte layer 2, 23, or 23'.

A peel strength of the solid electrolyte layer 2, 23, or 23' to the cathode layer 26 or 26' or to the anode layer 27 or 27' may be about 0.2 gf/mm or greater.

Anode Layer

The anode layer 27 or 27' may include an anode current collector 24 or 24', respectively, and an anode active material layer 25 or 25' on at least one surface of the anode current collector 24 or 24', respectively.

The anode active material layer 25 or 25' may include, for example, an anode active material and a binder.

The anode active material in the anode active material layer 25 or 25' may have, for example, a particle shape. An average particle diameter of the anode active material having a particle shape may be, for example, about 4 μm or less, about 3 μm or less, about 2 μm or less, about 1 μm or less, or about 900 nm or less. The average particle diameter of the anode active material having a particle shape may be, for example, about 10 nm to about 4 μm, about 10 nm to about 3 μm, about 10 nm to about 2 μm, about 10 nm to about 1 μm, or about 10 nm to about 900 nm. When the average particle diameter of the anode active material is within the above ranges, reversible absorbing and/or desorbing of lithium during charging and discharging may be more convenient. The average particle diameter of the anode active material may be, for example, a median diameter (D50) as measured utilizing a laser particle size distribution meter.

The anode active material included in the anode active material layers 25 or 25' includes, for example, at least one selected from a carbon-based anode active material and a metal and/or metalloid anode active material.

The carbon-based anode active material may include at least one selected from amorphous carbon and crystalline carbon. The carbon-based anode active material may be, for example, amorphous carbon. Examples of the amorphous carbon may include carbon black (CB), acetylene black (AB), furnace black (FB), ketjen black (KB), and graphene, but embodiments are not limited thereto, and any suitable amorphous carbon may be used as long as it is classified as amorphous carbon in the related art. Amorphous carbon is carbon having no crystallinity or having very low crystallinity, and is distinguished from crystalline carbon or graphite-based carbon.

The metal or metalloid anode active material includes at least one selected from gold (Au), platinum (Pt), palladium (Pd), silicon (Si), silver (Ag), aluminum (Al), bismuth (Bi), tin (Sn), and zinc (Zn), but embodiments are not limited thereto, and any suitable metal or metalloid anode active material may be used as long as it is utilized to form an alloy or compound with lithium in the related art. For example, because nickel (Ni) does not form an alloy with lithium, it is not utilized as a metal anode active material.

The anode active material layer 25 or 25' includes one selected from among these anode active materials, or includes a mixture of a plurality of different anode active materials. For example, the anode active material layer 22 includes only amorphous carbon, or includes at least one selected from gold (Au), platinum (Pt), palladium (Pd), silicon (Si), silver (Ag), aluminum (Al), bismuth (Bi), tin (Sn), and zinc (Zn). In some embodiments, the anode active material layer 25 or 25' includes a mixture of amorphous carbon and at least one selected from gold (Au), platinum (Pt), palladium (Pd), silicon (Si), silver (Ag), aluminum (Al), bismuth (Bi), tin (Sn), and zinc (Zn). A mixing ratio of the mixture of amorphous carbon and gold may be, for example, about 10:1 to about 1:2, about 5:1 to about 1:1, or about 4:1 to about 2:1 by weight, but embodiments are not limited thereto, and the mixing ratio is selected according to required characteristics of an all-solid secondary battery. When the anode active material has the composition, the cycle characteristics of the all-solid secondary battery may further improve.

The anode active material included in the anode active material layer 25 or 25' may include, for example, a mixture of first particles formed of amorphous carbon and second particles formed of metal or metalloid. Examples of the metal or metalloid may include gold (Au), platinum (Pt), palladium (Pd), silicon (Si), silver (Ag), aluminum (Al), bismuth (Bi), tin (Sn), and zinc (Zn). In some embodiments, the metalloid may be a semiconductor. An amount of the second particles may be about 8 wt % to about 60 wt %, about 10 wt % to about 50 wt %, about 15 wt % to about 40 wt %, or about 20 wt % to about 30 wt % based on the total weight of the mixture. When the amount of the second particles is within these ranges, cycle characteristics of the all-solid secondary battery may further improve.

Examples of the binder included in the anode active material layer 25 or 25' may include styrene-butadiene rubber (SBR), polytetrafluoroethylene, polyvinylidene fluoride, polyethylene, vinylidene fluoride/hexafluoropropylene copolymer, polyacrylonitrile, and polymethylmethacrylate, but embodiments are not limited thereto, and any suitable binder may be used as long as it is utilized as a binder in the related art. The binder may consist of a single binder or multiple different binders.

Because the anode active material layer 25 or 25' includes a binder, the anode active material layer 25 or 25' may be stabilized on the anode current collector 24 or 24'. Also, in the charging/discharging process, cracks of the anode active material layer 25 or 25' may be suppressed or reduced regardless of the volume change and/or the relative position change of the anode active material layer 25 or 25'. For example, when the anode active material layer 25 or 25' does not include a binder, it is possible for the anode active material layers 25 or 25' to be easily separated from the anode current collector 24 or 24'. In a portion where the anode active material layer 25 or 25' is separated from the anode current collector 24 or 24', the anode current collector 24 or 24' may be exposed to come into contact with the solid electrolyte layer 23 or 23', thereby increasing the possibility of an occurrence of a short circuit. The anode active material layer 25 or 25' is prepared by applying a slurry in which materials constituting the anode active material layer 25 or 25' are dispersed onto the anode current collector 24 or 24' and then drying the slurry. It is possible to stably disperse the anode active material in the slurry by including the binder in the anode active material layer 25 or 25'. For example, when the slurry is applied onto the anode current collector 24 or 24' by a screen printing method, it is possible to suppress or reduce the clogging of a screen (for example, clogging of a screen by aggregates of the anode active material).

The anode active material layer 25 or 25' may further include additives such as a filler, a coating agent, a dispersant, and an ion conducting agent used in an all-solid secondary battery of the related art.

A thickness of the anode active material layer 25 or 25' may be, for example, about 50% or less, about 40% or less, about 30% or less, about 20% or less, about 10% or less, or about 5% or less of a thickness of the cathode active material layer 22 or 22'. A thickness of the anode active material layer 25 or 25' may be, for example, in a range of about 1 μm to about 20 μm, about 2 μm to about 10 μm, or about 3 μm to about 7 μm. When the thickness of the anode active material layer 25 or 25' is too thin, the anode active material layer 25 or 25' may be disintegrated or damaged by lithium dendrites which are generated between the anode active material layer 25 or 25' and the anode current collector 24 or 24', which may deteriorate cycle characteristics of the all-solid secondary battery. When the anode active material layer 25 or 25' is too thick, the all-solid secondary battery may have a reduced energy density and an increased internal resistance, and thus. the all-solid secondary battery may have poor cycle characteristics.

When the thickness of the anode active material 25 or 25' is reduced, for example, the anode active material 25 or 25' may have a reduced charge capacity. For example, a charge capacity of the anode active material layer 25 or 25' may be about 50% or less, about 40% or less, about 30% or less, about 20% or less, about 10% or less, about 5% or less, or about 2% or less of a charge capacity of the cathode active material layer 22 or 22'. The charge capacity of the anode active material layer 25 or 25' may be, for example, in a range of about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the cathode active material layer 22 or 22'. When the charge capacity of the anode active material layer 25 or 25' is too small, a thickness of the anode active material layer 25 or 25' becomes so thin that the anode active material layer 25 or 25' may be disintegrated or damaged by lithium dendrites formed between the anode active material layer 25 or 25' and the anode current collector 24 or 24' during the repeated charging/discharging processes, and thus, the all-solid secondary battery may have poor lifespan characteristics. When the charge capacity of the anode active material layer 25 or 25' increases excessively, the all-solid secondary battery may have a reduced energy density and an increased internal resistance, and thus, the all-solid secondary battery may have poor lifespan characteristics.

The charge capacity of the cathode active material layer 22 or 22' may be obtained by multiplying a charge capacity density (mAh/g) of a cathode active material by a weight of the cathode active material in the cathode active material layer 22 or 22'. When different cathode active materials are used, a charge capacity density of each of the cathode active material layers may be multiplied by a respective weight thereof, and then the sum of the multiplication products may be calculated as the charge capacity of the cathode active material layer 22 or 22'. The charge capacity of the anode active material layer 25 or 25' may be calculated in the same manner. For example, the charge capacity of the anode active material layer 25 or 25' may be obtained by multiplying a charge capacity density (mAh/g) of an anode active material by a weight of the anode active material in the anode active material layer 25 or 25'. When different anode active materials are used, a charge capacity density of each of the anode active material layers may be multiplied by a respective weight thereof, and then the sum of the multiplication products may be calculated as the charge capacity of the anode active material layer 25 or 25'. Here, the charge capacity densities of the cathode active material and the anode active material are estimated capacities obtained for an all-solid half-cell including lithium metal as a counter electrode. The charge capacities of the cathode active material layer 22 or 22' and the anode active material layer 25 or 25' are directly calculated by charge capacity measurement using an all-solid half-cell. The measured charge capacity of each of the cathode active material and the anode active material may be divided by a weight of the corresponding active material, thereby obtaining a charge capacity density. In some embodiments, the charge capacities of the cathode active material layer 22 or 22' and the anode active material layer 25 or 25' may be initial charge capacities measured after the 1st charging cycle.

For example, the anode current collector 24 or 24' may be composed of a material that does not react with lithium to form an alloy or a compound. Examples of the material of the anode current collector 24 or 24' may include copper (Cu), stainless steel, titanium (Ti), iron (Fe), cobalt (Co), and nickel (Ni), but embodiments are not limited thereto, and any suitable material available as an electrode current collector in the art may be used. The anode current collector 24 or 24' may be formed of one of the examples of the metal or an alloy or a coating material of at least two metals selected from the examples. The anode current collector 24 or 24' may be, for example, in the form of a plate or a foil.

All-Solid Secondary Battery

An all-solid secondary battery may include the electrode structure 10 or 30.

Figure 3:
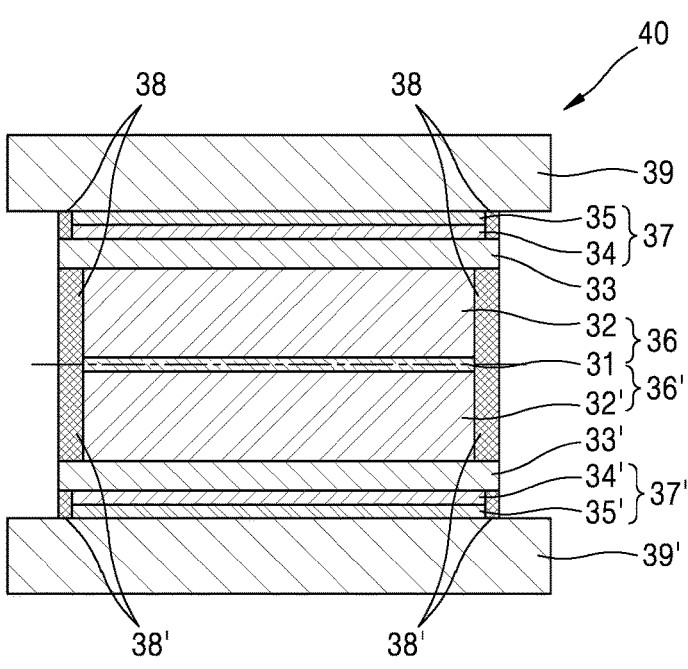
FIG. 3 is a schematic cross-sectional view of an all-solid secondary battery according to an embodiment.

FIG. 3 is a schematic view of an all-solid secondary battery 40 according to an embodiment.

Referring to FIG. 3, the all-solid secondary battery 40 is in a stack form. The electrode structure 40 has cathode layers 36 and 36' on cathode active material layers 32 and 32' on upper and lower surfaces of a cathode current collector 31, respectively; solid electrolyte layers 33 and 33' on one surface of the cathode layers 36 and 36', respectively; and anode layers 37 and 37' including anode active material layers 34 and 34' and anode current collectors 35 and 35' on one surface of the solid electrolyte layers 33 and 33', respectively. Insulating layers 38 and 38' are located at each of two sides (e.g., two opposite sides or both sides) of the cathode layers 36 and 36', the solid electrolyte layers 33 and 33', and the anode layers 37 and 37', respectively. Supporting members 39 and 39' are on one surface of the anode current collectors 35 and 35', respectively. The all-solid secondary battery 40 is prepared by being subject to a warm isostatic press (WIP) to the supporting members 39 and 39' on upper and lower surfaces and forming each of a cathode terminal and an anode terminal.

The all-solid secondary battery 40 may include the insulating layer 38 or 38' on two sides (e.g., two opposite sides or both sides) of the cathode layer 36 or 36', the solid electrolyte layer 33 or 33', and the anode layer 37 or 37' to suppress a short-circuit (or reduce a likelihood or degree of such a short-circuit), which minimizes or reduces initial capacity reduction, and thus, may improve lifespan characteristics.

One or more embodiments will now be described in more detail with reference to the following examples. However, these examples are not intended to limit the scope of the present disclosure.

EXAMPLE

Example 1

All-Solid Secondary Battery Including PVdF+Al$_2$O$_3$ Insulating Layer

Preparation of Anode Layer

A stainless steel (SUS) foil having a thickness of 10 μm was prepared as an anode current collector. Also, carbon black (CB) having a primary particle diameter (D50) of about 35 nm and silver (Ag) particles having an average particle diameter of about 60 nm were prepared as an anode active material.

4 g of a mixture powder prepared by mixing together the carbon black (CB) and silver (Ag) particles at a weight ratio of about 3:1 was put in a container, and 4 g of a N-methyl-2-pyrrolidone (NMP) solution including about 7 weight % (wt %) of a PVDF binder (#9300 available from Kureha Co.) was added to the container to prepare a mixture solution. Next, while gradually adding NMP to the mixture solution, the mixture solution was stirred to prepare a slurry. The thus prepared slurry was applied to the SUS foil using a doctor blade and dried in air at a temperature of about 60° C. for about 20 minutes to obtain a stack. The stack was vacuum-dried at a temperature of about 100° C. for about 12 hours to prepare an anode layer. A thickness of an anode active material layer of a silver-carbon (Ag—C) nanocomposite in the anode layer was about 7 μm. A silver (Ag) volume ratio in the Ag—C nanocomposite was about 8 vol %, and an amount of Ag used in preparation of a battery was about 12 mg/Ah.

Preparation of Cathode Layer

Li$_2$O—ZrO$_2$ (LZO)-coated LiNi$_{0.8}$Co$_{0.15}$Mn$_{0.05}$O$_2$ (NCM) was prepared as a cathode active material. The LZO-coated cathode active material was prepared according to the method disclosed in Korean Patent No. 10-2016-0064942, the entire content of which is incorporated herein by reference. A Li$_6$PS$_5$Cl solid electrolyte (D50=0.5 μm, crystalline), which is an argyrodite-type crystal, was prepared as a solid electrolyte. A polytetrafluoroethylene (PTFE) binder (Teflon binder, available from DuPont) was prepared as a binder. Carbon nanofiber (CNF) was prepared as a conducting agent. These materials were mixed together at a weight ratio of cathode active material:solid electrolyte: conducting agent:binder=85:15:3:1.5 in a xylene solvent and molded in the form of a sheet, and then the resultant mixture was vacuum-dried at 40° C. for 8 hours to prepare a cathode sheet. The cathode sheet was pressed onto one surface of a cathode current collector formed of an 18 μm-thick carbon coated aluminum foil to prepare a cathode layer. A thickness of the cathode layer was about 105 μm. A loading level of the cathode layer was about 6.8 mAh/cm$^2$.

Preparation of Solid Electrolyte Layer

1 part by weight of an acrylic binder with respect to 99 parts by weight of a solid electrolyte was added to a $Li_6PS_5Cl$ solid electrolyte (D50=3.0 μm, crystalline), which is an argyrodite-type crystal, to prepare a mixture. Xylene (available from FUJIFILM Wako Pure Chemical Corporation) and isobutyl isobutyrate (available from Aldrich) at a weight ratio of 50:50 were added to the mixture, and the resultant was stirred using a planetary centrifugal mixer (AR-100) at a rate of 2000 r.p.m. for 6 minutes to prepare a slurry. The thus prepared slurry was applied on a polyethylene terephthalate film having a thickness of 75 μm using a doctor blade and dried on a hot plate at a temperature of 50° C. for several minutes to obtain a stack. The stack was vacuum-dried at a temperature of about 40° C. for about 8 hours. Through these processes, a sold electrolyte layer was prepared. A thickness of the solid electrolyte layer was about 40 μm, and the solid electrolyte layer was pressed in a battery so that the thickness was about 30 μm.

Preparation of Slurry for Insulating Layer

A PVdF powder (#9300, available from Kureha Corporation) and an $Al_2O_3$ powder (50 nm, available from Sigma Aldrich) at a weight ratio of 1:3 were added and mixed together to prepare a mixture powder, 40 g of the mixture powder was put into a container, and an acetone solvent was added thereto to prepare a mixture solution. Subsequently, the mixture solution was stirred while gradually adding an acetone solvent to the mixture solution to prepare a slurry for an insulating layer.

Preparation of All-Solid Secondary Battery

As shown in FIG. 3, a solid electrolyte layer 33 was on an anode layer 37 such that an anode active material layer 34 is in contact with the solid electrolyte layer 33, and a cathode layer 36 was on the solid electrolyte layer 33 to prepare a stack. A margin of a width of the solid electrolyte layer 33 was about 2%.

The slurry for an insulating layer was integrally applied onto both surfaces of the stack including the anode layer 37, the cathode layer 36, and the solid electrolyte layer 33 using a doctor blade and was dried in air to prepare an electrode structure having an insulating layer 38. The insulating layer 38 had a storage elastic modulus (E') of 6.471 GPa and a loss tangent (tan δ) of 0.045.

The electrode structure having the insulating layer 38 on its both surfaces was placed in a laminate bag and vacuum sealed. Then, the vacuum sealed electrode structure was subjected to warm isostatic pressing (WIP) at a pressure of 500 MPa. Next, the electrode structure was taken from the laminate bag, and the Al and Ni terminals were each respectively welded onto the cathode and the anode using an ultrasonic welder. Subsequently, the electrode structure having the Al and Ni terminals projecting therefrom was placed in a laminate bag and vacuum sealed to prepare an all-solid secondary battery 40.

Example 2

All-Solid Secondary Battery Including Cellulose+Glass Fiber+$Al(OH)_3$ Insulating Layer

In the preparation of the slurry for an insulating layer, nanocellulose (clay for art, available from Pinocchio Corporation), glass fiber (diameter=2.7 μm, available from Whatman), and $Al(OH)3$ powder (5 μm, available from Sigma Aldrich) at a weight ratio of 1:1:1 were added and mixed together to prepare a mixture powder, 30 g of the mixture powder was put into a container, purified water was added to the container, and the resultant was pulverized to prepare a slurry for an insulating layer. Thereafter, an all-solid secondary battery 40 was prepared in substantially the same manner as in Example 1, except that the slurry for an insulating layer was dried at 100° C. for 12 hours to form an insulating layer 38 in a shape of a sheet, and the insulating layer 38 was punched in a shape of a square frame "□" to have an inner diameter of the same size as that of the solid electrolyte layer 33 of the stack including the anode layer 37, the cathode layer 36, and the solid electrolyte layer 33 such that the insulating layer 38 surrounds four sides of the stack without separate adhesion. The insulating layer 38 has a storage elastic modulus (E') of 19.87 GPa and a loss tangent (tan δ) was 0.024.

Example 3

All-Solid Secondary Battery Including Insulating Layer Having 3-Layer Structure Of Cellulose+Epoxy Resin+Cellulose

An all-solid secondary battery 40 was prepared in substantially the same manner as in Example 1, except that 2 g of an epoxy adhesive (EP935, available from Okong Corporation) was applied between two sheets of cellulose paper having a thickness of 60 μm instead of the slurry for an insulating layer to prepare an insulating layer structure of a 3-layer structure, in which cellulose, an epoxy resin, and cellulose were sequentially stacked, and that the insulating stack was fixed on both sides surfaces of the stack including the anode layer 37, the cathode layer 36, and the solid electrolyte layer 33 using the epoxy adhesive. The insulating layer 38 has a storage elastic modulus (E') of 39.63 GPa and a loss tangent (tan δ) was 0.034.

Comparative Example 1

All-Solid Secondary Battery Including PP+$ZrO_2$ Insulating Layer

An all-solid secondary battery 40 was prepared in substantially the same manner as in Example 1, except that a polypropylene zirconia film (MKP1848C, a capacitor material (semi-finished product), available from Vishay) having a thickness of about 230 μm was prepared instead of the slurry for an insulating layer, and the film was punched in a shape of a square frame, "□", to have an inner diameter of the same size as that of the solid electrolyte layer 33 of the stack including the anode layer 37, the cathode layer 36, and the solid electrolyte layer 33 such that the film surrounds four sides of the stack without separate adhesion. The insulating layer 38 had a storage elastic modulus (E') of 1.491 GPa and a loss tangent (tan δ) of 0.098.

Comparative Example 2

All-Solid Secondary Battery Including PMMA Insulating Layer

An all-solid secondary battery 40 was prepared in substantially the same manner as in Example 1, except that a transparent polymethylmethacrylate (PMMA) film (available from Sumitomo) having a thickness of about 350 μm was prepared instead of the slurry for an insulating layer, and the film was punched in a shape of a square frame, "□", to have an inner diameter of the same size as that of the solid electrolyte layer 33 of the stack including the anode layer 37, the cathode layer 36, and the solid electrolyte layer 33 such that the film surrounds four sides of the stack without separate adhesion. The insulating layer 38 had a storage elastic modulus (E') of 2.520 GPa and a loss tangent (tan δ) of 0.157.

Comparative Example 3

All-Solid Secondary Battery Including PTFE Insulating Layer

An all-solid secondary battery 40 was prepared in substantially the same manner as in Example 1, except that a polytetrafluoroethylene (PTFE) film (Hypersheet, available from Goretech) having a thickness of about 300 μm was prepared instead of the slurry for an insulating layer, and the film was punched in a shape of a square frame, "□", to have an inner diameter of the same size as that of the solid electrolyte layer 33 of the stack including the anode layer 37, the cathode layer 36, and the solid electrolyte layer 33 such that the film surrounds four sides of the stack without separate adhesion. The insulating layer 38 had a storage elastic modulus (E') of 0.200 GPa and a loss tangent (tan δ) of 0.198.

Materials for the insulating layers of the all-solid secondary batteries prepared in Examples 1 to 3 and Comparative Examples 1 to 3 and the storage elastic moduli (E'), storage non-elastic moduli (E"), and loss tangents (tan δ, E"/E') of the materials are shown in Table 1. The storage elastic moduli (E'), storage non-elastic moduli (E"), and loss tangents (tan δ, E"/E') of the materials for the insulating layer were derived by dynamic mechanical analysis (DMA) on a sample having a size of 10 m×5 mm of each of the materials using a sine wave having a frequency of 1 Hz.

TABLE 1

| | Insulating material | Storage elastic modulus [E', GPa] | Storage non-elastic modulus [E", GPa] | Loss tangent [tanδ, E"/E'] |
|---|---|---|---|---|
| Example 1 | PVdF + Al₂O₃ | 6.471 | 0.29 | 0.045 |
| Example 2 | Cellulose + glass fiber + Al(OH)₃ | 19.87 | 0.47 | 0.024 |
| Example 3 | 3-Layer structure of cellulose + epoxy resin + cellulose | 39.63 | 1.349 | 0.034 |
| Comparative Example 1 | PP + ZrO₂ | 1.491 | 0.146 | 0.098 |
| Comparative Example 2 | PMMA | 2.520 | 0.392 | 0.157 |
| Comparative Example 3 | PTFE | 0.200 | 0.039 | 0.198 |

Evaluation Example 1

Charge/Discharge Test

Charging and discharging characteristics of the all-solid secondary batteries prepared in Examples 1 to 3 and Comparative Examples 1 to 3 were evaluated by the following charge/discharge test. The charge/discharge test was performed with the all-solid secondary batteries each placed in a constant-temperature chamber of 45° C.

In the 1st cycle, the battery was charged with a constant current of about 0.1 C until a battery voltage was about 4.25 V, and once the battery voltage reached 4.25 V, the battery was charged with a constant voltage until a charge current was about 0.05 C. Next, the battery was discharged with a constant current of about 0.1 C until a battery voltage was about 2.5 V.

Then, the 1st cycle of the charging and discharging was repeated until the 50th cycle, and a capacity retention rate was calculated according to Equation 1. The results of an initial capacity and a capacity retention rate are shown in Table 2 and FIG. 4. The initial capacity is a discharge capacity at the 1st cycle.

$$\text{Capacity retention rate (\%)=[Discharge capacity at the 50th cycle/discharge capacity at the 1st cycle]×100} \quad \text{Equation 1}$$

TABLE 2

| | Initial capacity [mAh/g] | Capacity retention rate [%] |
|---|---|---|
| Example 1 | 188.44 | 92.7 |
| Example 2 | 190.03 | 92.8 |
| Example 3 | 189.86 | 93.2 |
| Comparative Example 1 | 188.22 | 77.6 |
| Comparative Example 2 | 188.98 | 38.6 |
| Comparative Example 3 | 156.86 | Short-circuit occurrence (1st cycle) |

Figure 4:
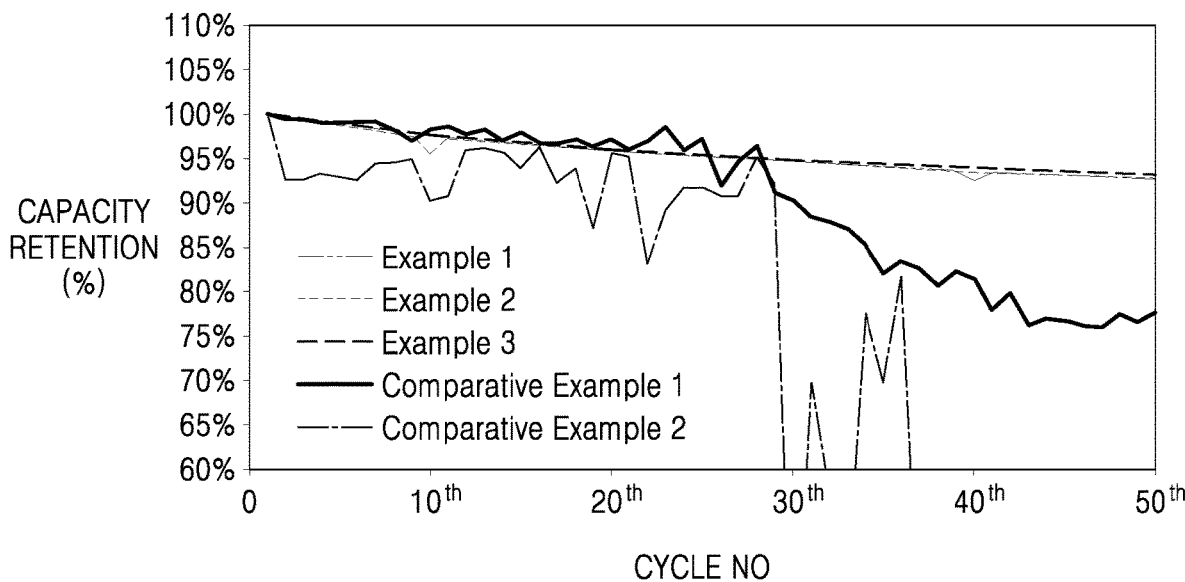
FIG. 4 is a graph that shows lifespan characteristics of all-solid secondary batteries prepared in Examples 1 to 3 and Comparative Examples 1 and 2.

As shown in Table 2 and FIG. 4, the all-solid secondary batteries prepared in Examples 1 to 3 had initial capacities that were the same as or improved from those of the all-solid secondary batteries prepared in Comparative Examples 1 to 3, and capacity retention rates of the all-solid secondary batteries prepared in Examples 1 to 3 were also improved.

In this regard, it may be known that the all-solid secondary batteries prepared in Examples 1 to 3 include an insulating layer having a storage elastic modulus of 6.471 GPa or greater and a loss tangent of less than 0.045 at both sides of an electrode structure, which thus has a restoring force during charging and discharging of the battery while preventing or reducing occurrence of initial short-circuit, and thus, the all-solid secondary batteries prepared in Examples 1 to 3 had excellent initial capacity and capacity retention rate.

As described above, according to one or more embodiments, an electrode structure includes a cathode layer, an anode layer, and a solid electrolyte layer between the cathode layer and the anode layer, wherein the solid electrolyte layer has no margin or a margin of about 2% or less of a width of the solid electrolyte layer at both ends in a width direction, and an insulating layer having a storage elastic modulus (E') of greater than 4.0 GPa is at both sides integrally surrounds the cathode layer, the anode layer, and the solid electrolyte layer.

The electrode structure may suppress a short-circuit (or reduce a likelihood or degree of such a short-circuit) by having the insulating layer even when the margin of the width of the solid electrolyte layer is very little or none, which reduces initial capacity, and thus, may provide an all-solid secondary battery having improved lifespan characteristics.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and equivalents thereof.

What is claimed is:

1. An electrode structure comprising:
a cathode layer;
an anode layer; and
a solid electrolyte layer between the cathode layer and the anode layer,
wherein the cathode layer comprises a cathode current collector and a cathode active material layer on at least one surface of the cathode current collector,
the anode layer comprises an anode current collector and an anode active material layer on at least one surface of the anode current collector, and
the solid electrolyte layer has a margin that is about 2% or less of a width of the solid electrolyte layer, at two ends in a width direction,
wherein an insulating layer having a storage elastic modulus (E') of greater than about 4.0 GPa is at two sides integrally surrounding the cathode layer, the anode layer, and the solid electrolyte layer,
wherein the solid electrolyte layer protrudes further into the insulating layer than the cathode layer and the anode layer, and
wherein the solid electrolyte layer does not protrude into the insulating layer more than about 2% of the width of the solid electrolyte layer at the two ends in the width direction.

2. The electrode structure of claim 1, wherein the insulating layer has a loss tangent (tan δ) of less than about 0.5.

3. The electrode structure of claim 1, wherein the insulating layer has a resistivity of about $1 \times 10^6$ ohm-cm or greater.

4. The electrode structure of claim 1, wherein the insulating layer is at least one layer.

5. The electrode structure of claim 1, wherein the insulating layer comprises a polymer or a composite of a polymer and an inorganic material.

6. The electrode structure of claim 5, wherein the polymer comprises a fluorine-based polymer, a cellulose-based polymer, an epoxy-based resin, or a combination thereof.

7. The electrode structure of claim 5, wherein a volume ratio of the polymer in the composite of the polymer and the inorganic material is about 50 vol % or greater based on 100 vol % of a total composition forming the composite.

8. The electrode structure of claim 5, wherein the inorganic material comprises a metal oxide, a metal hydroxide, or a combination thereof.

9. The electrode structure of claim 1, wherein a mixture density of the cathode active material layer is about 3.0 g/cc or greater.

10. The electrode structure of claim 1, wherein the cathode active material layer comprises a sulfide-based solid electrolyte.

11. The electrode structure of claim 1, wherein the anode active material layer comprises at least one selected from a carbonaceous anode active material and a metal or metalloid anode active material.

12. The electrode structure of claim 11, wherein the carbonaceous anode active material comprises at least one selected from amorphous carbon and crystalline carbon.

13. The electrode structure of claim 11, wherein the metal or metalloid anode active material comprises at least one selected from gold (Au), platinum (Pt), palladium (Pd), silicon (Si), silver (Ag), aluminum (Al), bismuth (Bi), tin (Sn), and zinc (Zn).

14. The electrode structure of claim 1, wherein the solid electrolyte layer comprises at least one selected from $Li_{7-x}PS_{6-x}Cl_x$, $Li_{7-x}PS_{6-x}Br_x$, and $Li_{7-x}PS_{6-x}I_x$, wherein $0 \leq x \leq 2$.

15. The electrode structure of claim 1, wherein a peel strength of the solid electrolyte layer to the cathode layer or the anode layer is about 0.2 gf/mm or greater.

16. The electrode structure of claim 1, wherein the electrode structure has a jelly-roll form or a stack form.

17. An all-solid secondary battery comprising the electrode structure of claim 1.

* * * * *